United States Patent [19]

Nishino

[11] Patent Number: 5,554,294
[45] Date of Patent: Sep. 10, 1996

[54] METHOD FOR DISSOLVING SLUDGE AND RECOVERING CONSTITUENTS THEREFROM

[75] Inventor: Tadashi Nishino, Tokyo, Japan

[73] Assignee: Yukiyoshi Iwamoto, Tokyo, Japan

[21] Appl. No.: 503,675

[22] Filed: Jul. 18, 1995

Related U.S. Application Data

[63] Continuation of Ser. No. 187,616, Jan. 27, 1994, abandoned.

[30] Foreign Application Priority Data

Jan. 29, 1993 [JP] Japan .................................. 5-013060

[51] Int. Cl.$^6$ ..................................................... C02F 1/42
[52] U.S. Cl. ............................ 210/663; 210/688; 210/661
[58] Field of Search ............................... 210/685, 663, 210/684, 677, 688, 668, 661; 148/253, 264

[56] References Cited

U.S. PATENT DOCUMENTS

| | | | |
|---|---|---|---|
| 3,973,987 | 8/1976 | Hewitt et al. | 210/167 |
| 4,033,868 | 7/1977 | Meischnee et al. | 210/669 |
| 4,130,446 | 12/1978 | Murakami et al. | 427/345 |
| 4,518,508 | 5/1985 | Conner | 210/751 |
| 4,863,612 | 9/1989 | Kirman et al. | 210/662 |
| 4,895,659 | 1/1990 | Semmens et al. | 210/638 |
| 5,047,126 | 9/1991 | Greenberg | 204/151 |
| 5,108,615 | 4/1992 | Hosea et al. | 210/668 |
| 5,178,746 | 1/1993 | Darnall et al. | 210/735 |
| 5,192,418 | 3/1993 | Hughes et al. | 205/100 |
| 5,259,960 | 11/1993 | Beck et al. | 210/684 |

FOREIGN PATENT DOCUMENTS

| | | |
|---|---|---|
| 0520524 | 12/1992 | European Pat. Off. . |
| 2330778 | 6/1977 | France . |
| 2629776 | 1/1977 | Germany . |

OTHER PUBLICATIONS

*Perry's Chemical Engineers Handbook*, 6th Edition, McGraw-Hill (1984) pp. 16-1, 16-5, 16-45, 16-46.
Database WPI, Section Ch, Week 8339, Derwent Publications Ltd.
Patent Abstracts of Japan, vol. 4, No. 173 (1980).

Primary Examiner—Cynthia L. Nessler
Attorney, Agent, or Firm—David G. Conlin; Peter F. Corless

[57] ABSTRACT

The present invention provides a method for dissolving slightly soluble sludge which is produced during chemical conversion coating of metal, which comprises agitating the sludge in an aqueous suspension containing hydrogen type strongly acidic cation exchange resin; exchanging metallic components in the sludge with the resin and adsorbing the metallic components on the resin; dissolving oxyacid components in the sludge into liquid phase; and recovering the metallic components from the resin and the oxyacid components from the resin and the oxyacid components from the solution. The sludge can be dissolved by simple operation and equipment, and effective components in the sludge can be recovered at high yield. The method contributes to effective re-utilization of resources and to prevention of environmental pollution and makes it possible to use the resin semipermanently by regenerating the used ion exchange resin.

10 Claims, 6 Drawing Sheets

Dissolution process of sludge in aqueous suspension containing H-R

Dissolution process of sludge in aqueous suspension containing H-R

METHOD FOR DISSOLVING SLUDGE AND RECOVERING CONSTITUENTS THEREFROM

This is a continuation of application Ser. No. 08/187,616 filed on Jan. 27, 1994, now abandoned.

BACKGROUND OF THE INVENTION

The present invention relates to a method for dissolving slightly soluble sludge which is produced during chemical conversion coating of metals and for recovering constituents such as phosphoric acid and metals from the sludge to reuse.

In order to form and fix non-corrosive insoluble phosphate on metal surface for the purposes such as rust inhibition, electric insulation and undercoating for painting or lubrication, chemical conversion coating with phosphoric acid and metal phosphate is widely used, both domestic and abroad. The surface treatment of metal is applied to various articles such as an automobile body, household electrical appliances, a cannon ball, an iron pipe, building materials, and etc.

The solvents used in the phosphate chemical conversion coating as described above are sort out zinc type, manganese type, and iron type solvents depending on the type of the metal treated. For example, a solution composed of zinc dihydrogenphosphate and phosphoric acid is primarily used, and the chemical coating is conducted by spray or immersion method. For instance, when a car body made of steel plate is immersed with a zinc phosphate type agent and coating is formed on surface of the car body, crystalline of Hopeit $[Zn_3(PO_4)_2 \cdot 4H_2O]$ or phosphorite in which some zinc substituted with iron is deposited. Iron in the body reacts with phosphoric acid in an etching agent and large quantity of sludge containing iron phosphate (III) as main component is produced in the bath as shown in the following reactions,

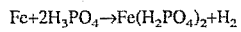

$Fe + 2H_3PO_4 \rightarrow Fe(H_2PO_4)_2 + H_2$

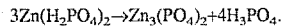

$3Zn(H_2PO_4)_2 \rightarrow Zn_3(PO_4)_2 + 4H_3PO_4.$

At present, however, no method is available to re-utilize large quantity of sludge thus produced, and the sludge must be dumped and buried in specific area or abandoned into the sea at considerable expense or, for example, must be treated with alkali under water and heating (Japanese Patent Publication 58-39768) or treated by hydrothermal reaction at high temperature and pressure. However, because of difficulty in operation and high cost for the equipment and devices associated with such operation, these methods and techniques are still far from practical applications such as complete dissolution of sludge and effective utilization of resources in terms of workability and economic feasibility.

The enforcement of strict legal regulations on the disposal of industrial waste in recent years has now made it impossible to execute conventional methods for waste disposal, and there are now strong and imminent demand on the development of methods, which are simple in operation and high in workability and require less cost and which are useful for chemical dissolution of the sludge and effective utilization of resources and for protection of global environment.

SUMMARY OF THE INVENTION

The present inventor has found that the above problems can be completely resolved through treating the sludge with hydrogen type strongly acidic cation exchange resin (hereinafter may be referred as "H—R") and has reached the present invention.

Specifically, the present invention provides a method for dissolving slightly soluble sludge which is produced during chemical conversion coating of metal, which comprised agitating the sludge in an aqueous suspension containing hydrogen type strongly acidic cation exchange resin. As a result, metal components in the sludge are ion-exchanged with the resin and adsorbed on the resin and oxyacid components in the sludge are dissolved out in liquid phase, and the metal components and the oxyacid components in the sludge are recovered.

DETAILED DESCRIPTION OF THE PREFERRED EMBODIMENTS

Figure 1A:
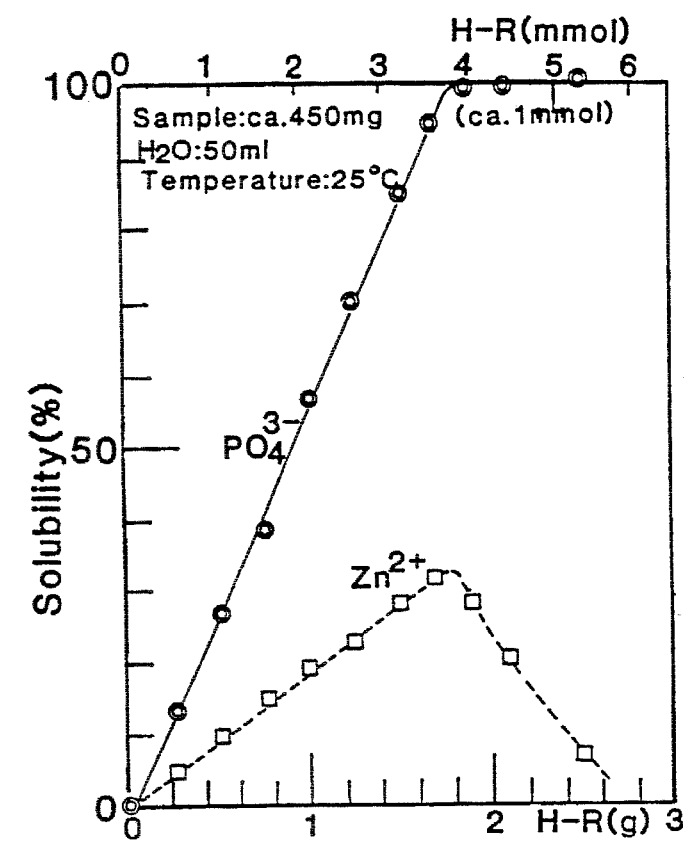
FIG. 1 (which includes FIGS. 1A and 1B) is a graphic representation of dissolution process of zinc phosphate, Hopeit $[Zn_3(PO_4)_2 \cdot 4H_2O]$, in a suspension of H—R.

The sludge produced during chemical conversion coating of metal (chemical finishing) includes the sludges produced in various applications such as rust prevention for a car body, household electrical appliances, a cannon ball, an iron pipe, building materials and etc., or for undercoatings for painting or lubrication and for electric insulation. This type of sludge is extremely difficult to dissolve.

The hydrogen type strongly acidic cation exchange resin used in the present invention may be commercially available, both domestic and abroad, or synthetic products. Typically, it contains styrene type resin (divinyl benzene as crosslinking agent), or phenol type macromolecule as base substance, and sulfonic acid group ($—SO_3H$) is bonded with it. The hydrogen type strongly acidic cation exchange resins are classified into gel type, porous type, and high porous type (MR type). There are the products with the following trade name:

1. Gel type
   1) DIAION SK Series (SK102, SK106, SK110, SK112, and SK116)
   (manufactured by Mitsubishi Kasei Corporation)
   2) AMBERLITE (IR120B, IR112, IR118, IR116, IR121, IR122 and IR124)
   (manufactured by Rohm & Haas)
   3) DUOLITE (C20 and C20S)
   (manufactured by Rohm & Haas)
   4) DOWEX (50W, HGR, HGR-W2, HCR-S and HCR-W2)
   (manufactured by Dow Chemical Corporation)
   5) LEVATIT (S100 and US800)
   (manufactured by Bayer AG)

6) IMAK DUOLITE (C37 and C12)
(manufactured by Duolite International Inc.)
7) IONAK ( C-240)
(manufactured by Ionak Chemical Corporation)
8) PERMTIT (225 and 425)
(manufactured by Permtit JMBH)
2. Porous type
DIAION PK Series (PK208, PH212, PK216, PK220 and PK228)
(manufactured by Mitsubishi Kasei Corporation)
3. High porous type
1) DIAION HPK Series (HPK16, HPK20 and HPK25)
(manufactured by Mitsubishi Kasei Corporation)
2) AMBERLITE (200)
(manufactured by Rohm & Haas)
3) AMBERL ST (15)
(manufactured by Rohm & Haas)
4) DUOLITE (ES291 and C-26)
(manufactured by Rohm & Haas)
5) DOWEX (88 and MSC-1)
(manufactured by Dow Chemical Corporation)
6) LEVATIT (SP112, SP120, VPOC1052, USP812)
(manufactured by Bayer AG)
7) IMAK-DUOLITE (C8P and C16P)
(manufactured by Duolite International Inc.)

In addition, there are other commercial products such as VOFATIT (Hemiarley Inc.), PYROLITE (Pyrolite Corporation), etc.

According to the present invention, the sludge produced during phosphatizing process of metal is dissolved with hydrogen type strongly acidic cation exchange resin to recover phosphoric acid, and the recovered phosphoric acid is re-utilized as a phosphating agent. At the same time, metallic ions adsorbed on the resin are collected during regeneration of the resin using hydrochloric acid solution and can be re-utilized. Thus, the method is highly convenient and useful in terms of high dissolution ratio, simple operation, less expensive equipment and device, and economic feasibility of the treatment.

In order to elucidate a dissolution mechanism of the sludge, the present inventor conducted dissolution treatment on heat-resistant, hardly soluble compound, Hopeit $[Zn_3(PO_4)_2 \cdot 4H_2O]$, which is deposited on steel plate surface during phosphate chemical coating, and also on a bivalent iron salt $[Fe_3(PO_4)_2 \cdot 6H_2O]$ for comparison.

Figure 1B:
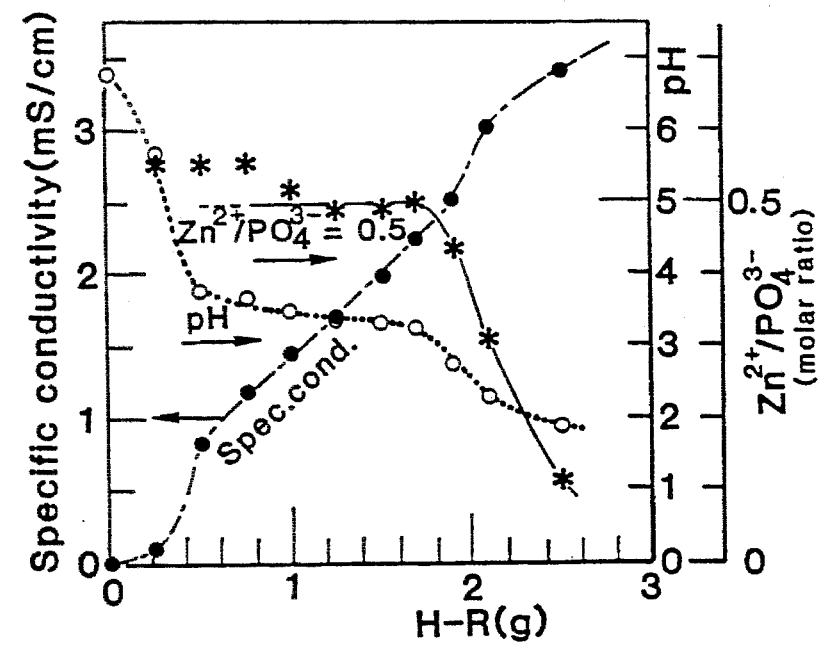

As shown in FIG. 1, 0.5 g of Hopeit was placed into as aqueous suspension (water contents: 50 ml) containing 0 to 2.25 g of H—R. After the suspension was agitated for about 30 minutes at room temperature, it was filtered, and elution ratio (%) was calculated from the results of chemical analysis of the filtrate, and this was plotted as a function of the quantity of H—R. Here, elution ratio is defined as the ratio of detected chemical species to quantity of the chemical species in the specimen obtained from the results of chemical analysis and is expressed in %. The changes of pH and electrical conductivity (unit: mS/cm) of the filtrate are measured are also shown. From this, it is evident that 0.5 g (about 1 milli-mol) of the hardly soluble Hopeit is dissolved in aqueous suspension of H—R, and it was confirmed from the elution ratio of zinc that the dissolution proceeds through two stages. That is, in the first stage, Hopeit reacts with H—R and is dissolved out as $Zn(H_2PO_4)_2$ and ion exchange of zinc ions which are dissolved into the solution with H—R proceeds, and all of the dissolved zinc are adsorbed on the resin. It is understood that a soluble $Zn(H_2PO_4)_2$ is produced in an intermediate stage because molar ratio of $Zn^{2+}/PO_4^{3-}$ is 0.5. Such dissolution process in two stages was also observed between calcium phosphate compounds and H—R.

Figure 2A:
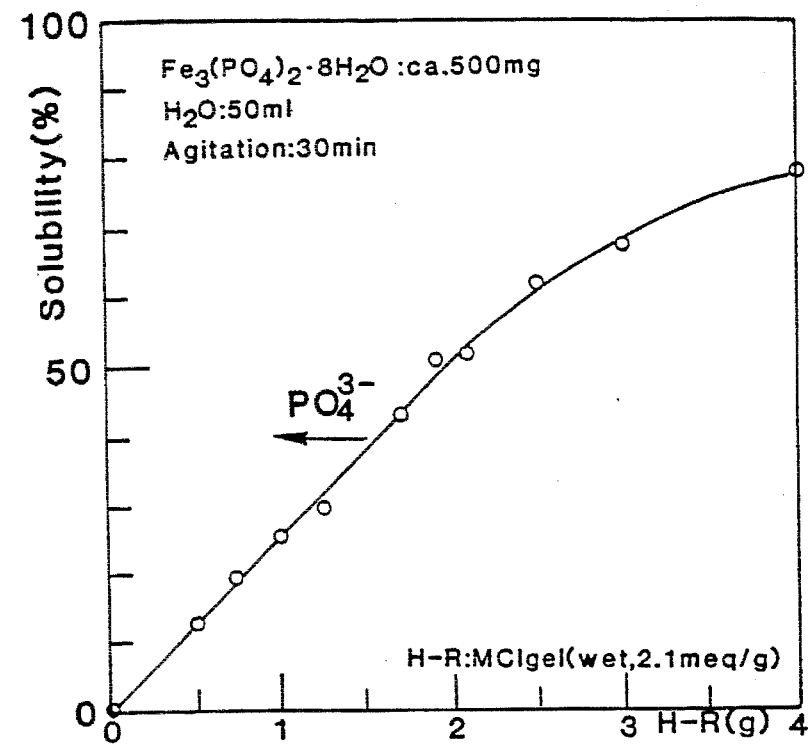
FIG. 2 (which includes FIGS. 2A and 2B) is a graph showing dissolution process of $Fe_3(PO_4)_4 \cdot 8H_2O$ in an aqueous suspension containing H—R.
Figure 2B:
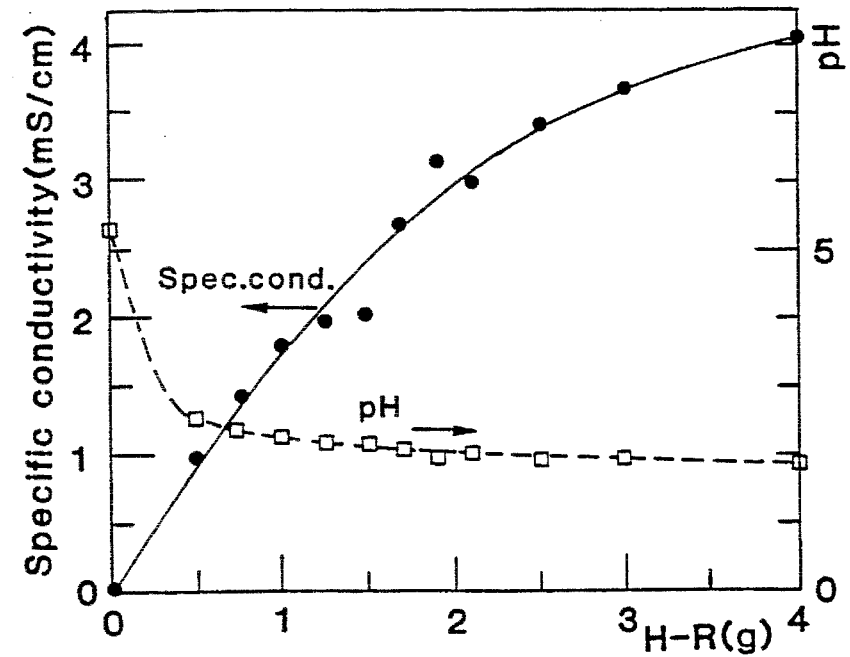

FIG. 2 shows dissolution process of iron phosphate (II) with H—R similar to that of FIG. 1. From the chemical composition, it was anticipated that dissolving behavior similar to that of Hopeit may be seen, but the results were entirely different, and dissolution process in a single stage was observed at room temperature. The equilibrium was reached with maximum elution ratio at about 80%.

As it is evident from the above results, the hardly soluble metal sludge is dissolved through ion exchange reaction with H—R, and the metallic components and phosphoric acid can be recovered, and this makes it possible to prevent destruction of environment and to achieve effective utilization of resources.

By the dissolution mechanism as described above, metal sludge is dissolved and its components can be recovered and re-utilized according to the present invention.

Metal adsorbed on H—R particles is recovered as chloride solution during regeneration process using mineral acid such as hydrochloric acid solution, and phosphoric acid produced in the dissolution process can be reused for a phosphating agent after condensation.

Since no mineral acid is used in the present invention, the mthod is simple in operation and recovery ratio is high compared with the conventional methods. Initial investment can be limited only to that of agitator for reaction, H—R, hydrochloric acid for regeneration and column for regeneration, and large size special equipment and devices are not required. The resin once used can be semipermanently utilized by regenerating it. Because resin in spherical particles with 1.1 of specific gravity is used, rapid dissolution due to homogeneous agitation and quick filtration can be accomplished.

When sludge is treated with a hydrogen type strongly acidic ion exchange resin in water, ion exchange reaction occurs between metallic ions in the sludge slightly dissociated in water and $H^+$ ions in the ion exchange resin. The process accelerates dissotiation tendency to produce metal-resin and oxyacid, and the sludge is finally dissolved.

In the following, description will be given on embodiments of the present invention, whereas the invention is not limited to these embodiments.

EXAMPLE 1

Sludge produced during the coating of an automotive body in a solution composed of zinc phosphate $[Zn(H_2PO_4)_2]$ and phosphoric acid was treated with a hydrogen type strongly acidic cation exchange resin (H—R).

For the wet sludge containing light green liquid of the specimen, pH of liquid phase was 3.49, specific conductivity κ was 14.32 mS/cm, and $PO_4$ was detected as 15,000 ppm, $NO_3$ as 3,041 ppm, F as 800 ppm, Cl as 110 ppm, and $SO_4$ as 67 ppm. This sludge was previously filtered and washed with enough pure water, and it was then filtered under reduced pressure and dried at 110° C. to prepare the specimen for dissolution.

Chemical composition of the sludge dried at 110° C. was a phosphate containing metallic components such as iron and zinc as shown in Table 1. The sludge was light yellow and extremely fine powder. The results of powder X-ray diffraction analysis revealed that it was non-crystalline, and crystalline substance such as the main component mineral Hopeit was not found.

TABLE 1

| Fe | Zn | Na | K | PO$_4$ | F | (Weight %) NO$_3$ |
|---|---|---|---|---|---|---|
| 20.26 | 4.16 | 1.36 | 0.0096 | 58.36 | 1.00 | <0.005 |

Figure 3:
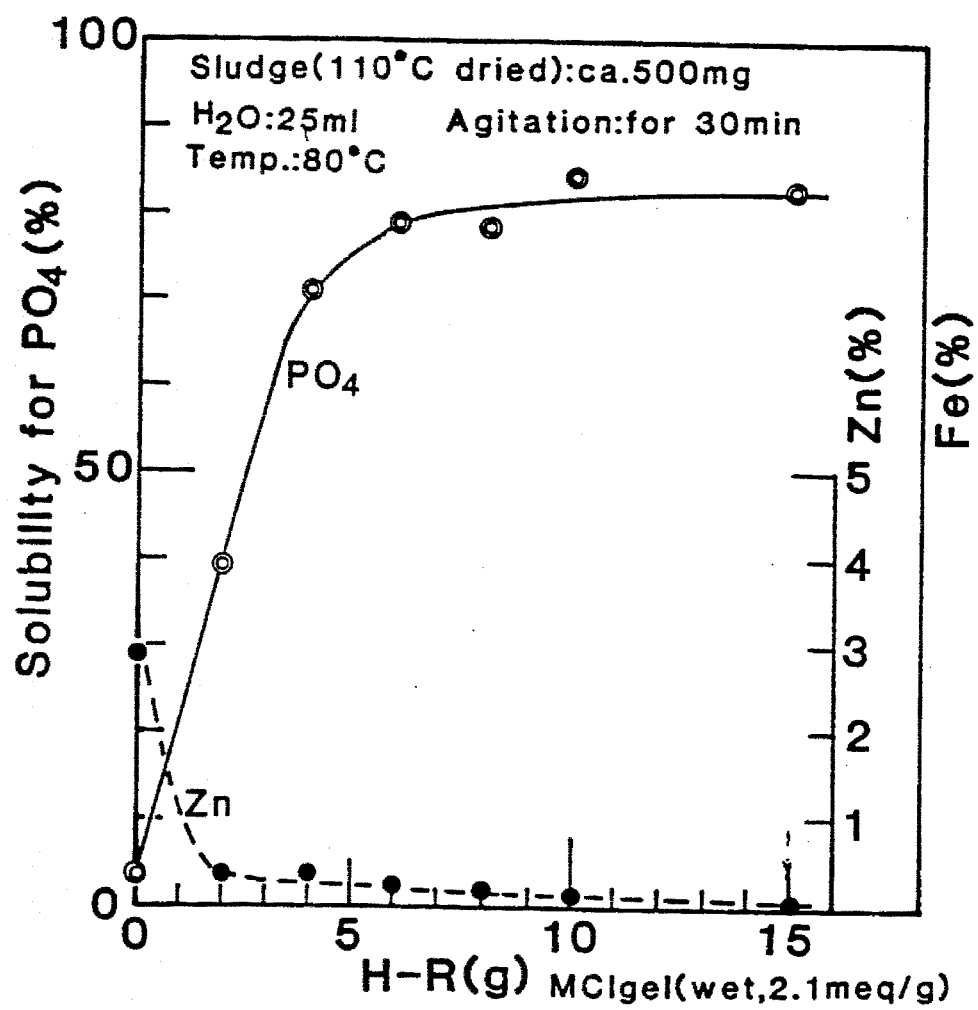
FIG. 3 is a graph showing dissolution process of sludge in an aqueous suspension containing H—R.

To 0.5 g of the specimen sludge in 25 ml of water, 0 to 15 g of hydrogen type strongly acidic cation exchange resin (exchange capacity: 2.1 meq/g; MCI gel manufactured by Mitsubishi Kasei Corporation) (H—R) was added, and the mixture was agitated for 30 minutes at 80° C. FIG. 3 shows the relationship between PO$_4$ elution ratio (%) of the filtrate after reaction for 30 minutes at 80° C. with the quantity of H—R added (0 to 15 g), and elution ratios of Zn, Fe and Na are also shown.

As it is evident from FIG. 3, it was found that about 80% of the sludge was dissolved when it was treated with the resin in the quantity by about 10 times as much as the sludge specimen. Because the results were similar to the dissolution curve of iron phosphate (II) by H—R as shown in FIG. 2, it was estimated that the same dissolution mechanism occurred in the process. One of the reasons why complete dissolution did not occur and elution ratio was about 80% may be due to equilibrium of the reaction. Specifically, with the increase of the amount of H—R added, dissolution of the sludge proceeds, but concentration of phosphoric acid in the solution increases at the same time which hinders secondary dissolution of the sludge into phosphoric acid solution. Thus, apparent equilibrium may have been reached in the reaction. Liberation of this high concentration phosphoric acid is evident from high viscosity of the eluate. In order to dissolve the sludge completely, there are two methods in which the first one is to increase water/sludge ratio (over 50) and the second one is to conduct dissolution steps in several stages at relatively low raio of water/sludge (around 15–20). The conventional ration of water/sludge is about 20 to 25. The former method is disadvantageous in that reaction speed is slow and the method requires long time, and it is desirable to conduct the process at relatively high dispersion concentration according to the latter method. Thus, the latter dissolution process was studied. For example, in the dissolution process shown in FIG. 3, 6 g of H—R was added and agitated, and after filtration, phosphate solution was recovered. Then, the residue containing small quantity of sludge and the resin already exchanged were as dispersed in 25 ml of water, and the process was proceeded after adding 2 g of H—R. By adding H—R twice, the sludge was completely dissolved, and it was found from analysis of the eluate in the first and the second additions that PO$_4$ elution ratio reached almost 100%.

Figure 4:
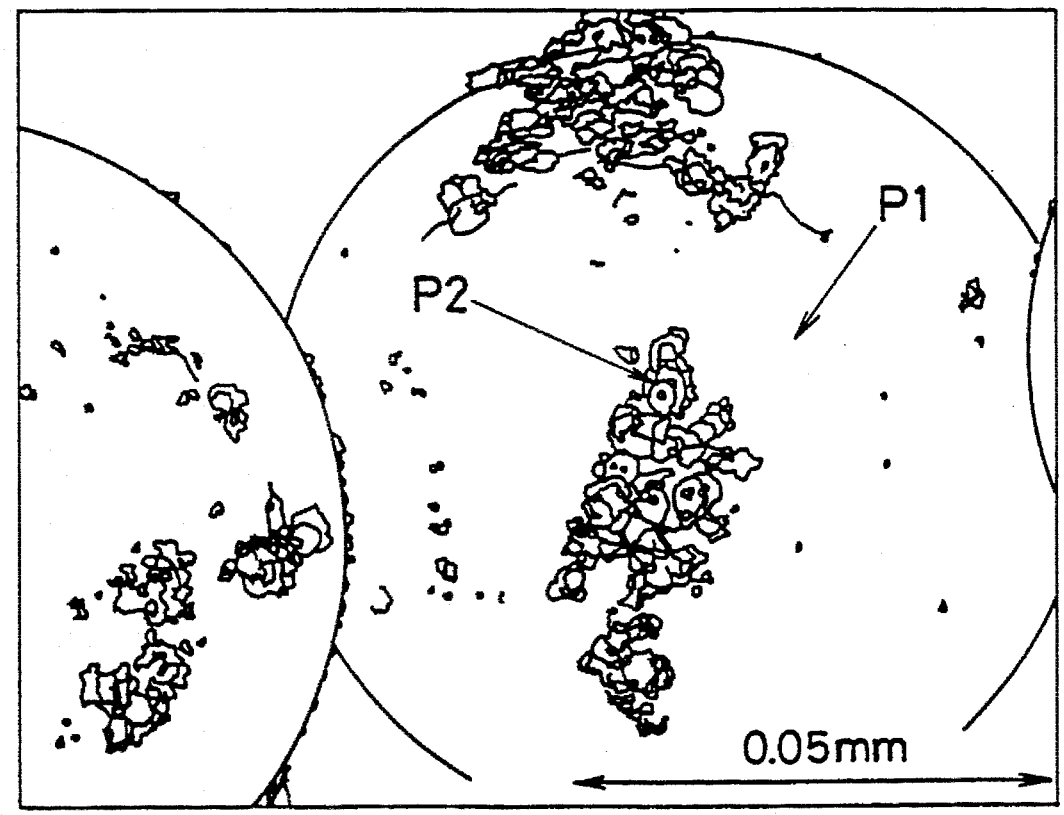
FIG. 4 is an illustration of an electron micrograph of the resin remaining from dissolution processing in FIG. 3.

FIG. 4 is an illustration of electron micrograph of the resin obtained in the experiment (added quantity of H—R:10 g) of FIG. 3. In this micrograph, resin (H—R) of about 0.1 mm in diameter and undissolved sludge particles attached on surface of the resin are observed. P1 and P2 shown by arrows are the resin surface and the attached sludge particles respectively. Electron beam was concentrated on these spots (P), and energy dispersion type detector was used to qualitatively detect component elements from the characteristic X-ray. The results are shown in FIG. 5 and FIG. 6.

Figure 5:
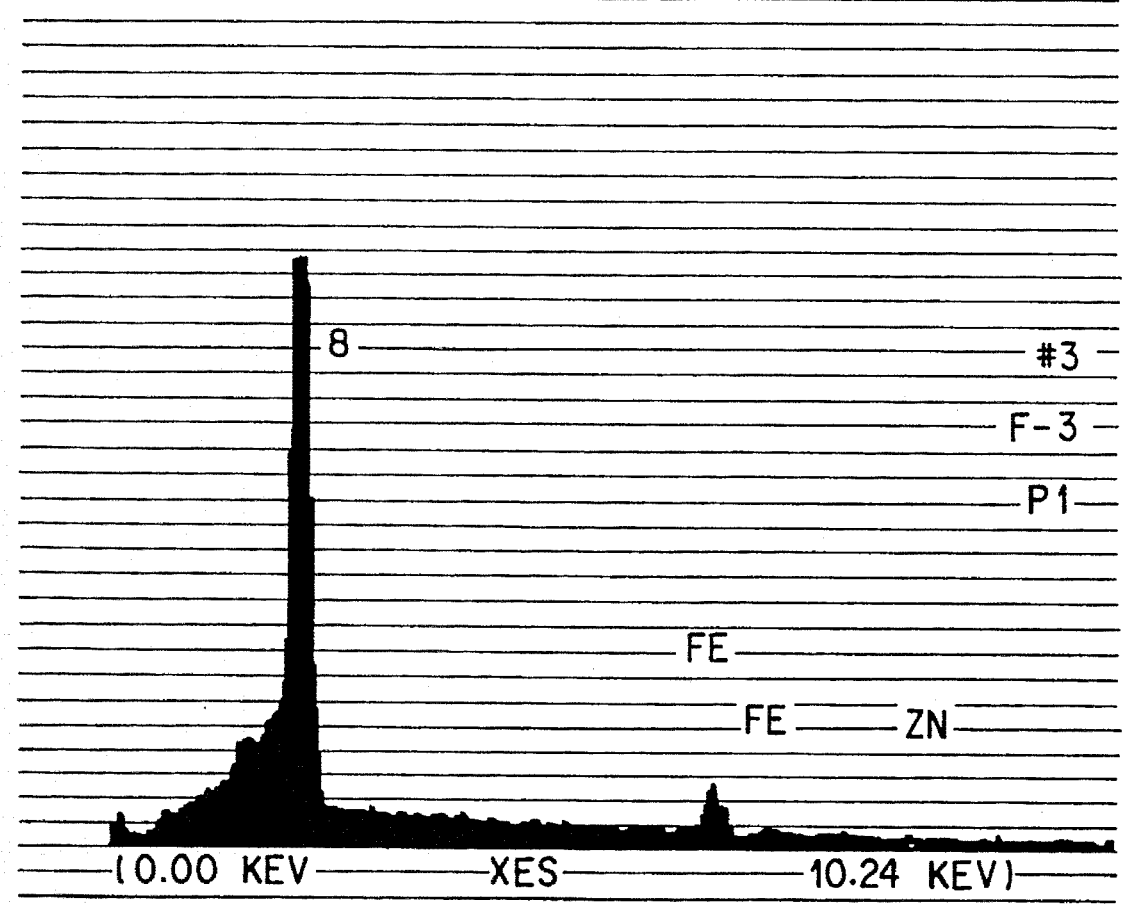
FIG. 5 shows an energy dispersion type characteristic X-ray spectrum on surface of the resin of FIG. 4.
Figure 6:
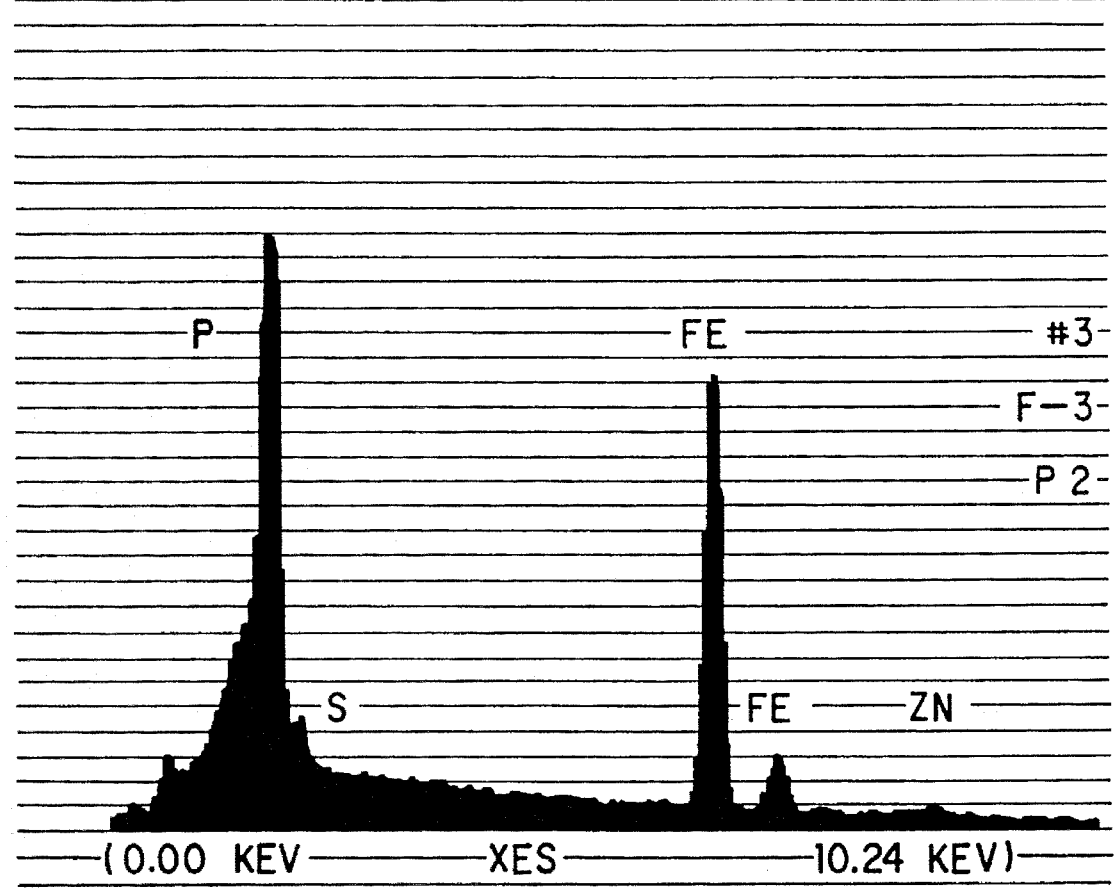
FIG. 6 is an energy dispersion type characteristic X-ray spectrum of undissolved particles attached on surface of the resin of FIG. 4.

From the surface of H—R (P-1) after treating the sludge in FIG. 5, Fe (iron) and Zn (zinc) were detected as well as S (sulfur). S was derived from function group (sulfonic acid group) of the H—R resin, and Fe and Zn were adsorbed by ion exchange. In contrast, it was found from FIG. 6 that the attached particles (P2) in FIG. 6 contain S only in small quantity and the particles contain mostly Fe, Zn and P. The composition is close to the composition of the sludge and it is deduced to be the remaining undissolved sludge.

EXAMPLE 2

Using hydrogen type strongly acidic cation exchange resin (H—R)(exchange capacity: 1.08 meq/g; SK116 manufactured by Mitsubishi Kasei Corporation) (particle size 0.8 mm) (wet resin), 260 g of the specimen sludgeas used in Example 1 was placed into about 5 liters of purified water (pH was 4.21; κ was 0,395 mS/cm). While agitating the mixture at room temperature and adding 500 g of H—R thereto each time, and the value of κ in liquid phase was read. Total quantity H—R added was 9.2 kg.

As shown from FIG. 4, pH was 1.54 and the value of κ was 17.53 mS/cm. From about 4.5 liters obtained through filtration under reduced pressure, 2 ml of the solution was diluted to 1 liter. The dissolved PO$_4$ was analyzed and the elution ratio was approximately calculated as 61%.

As described above, the method for treating the sludge with H—R according to the present invention makes it possible to recover and re-utilize large quantity of sludge, which has been abandoned as industrial waste in the past.

The method according to the present invention is very simple in operation and requires no complicated or special equipment and apparatus, contributes to effective re-utilization of resources and prevention of environmental pollution, provides high recovery rate of useful components in sludge and has effect to accomplish semipermanent repeated utilization of the used resin by regenerating it.

What is claimed is:

1. A method for dissolving slightly soluble sludge which is produced during chemical conversion coating of metal, consisting of agitating the sludge in an aqueous suspension containing hydrogen type strongly acidic cation exchange resin; ion-exchanging metallic components in the sludge with the resin and adsorbing the metallic components on the resin; dissolving oxyacid components in the sludge into liquid phase, and recovering the oxyacid components from the solution and the metallic components from the resin.

2. The method according to claim 1 in which dissolving step is defined by repeatedly dissolving the oxyacid component in the sludge at high dispersion concentration.

3. The method according to claim 1 or 2 in which the sludge is produced when phosphate chemical conversion coating is applied to a surface of metals.

4. The method according to claim 1 or 2 in which the chemical conversion coating is applied to a car body, household electrical appliances, a cannon ball, an iron pipe, or building materials.

5. A method of treating slightly soluble sludge produced during chemical conversion coating of metal, consisting of:

agitating the sludge in an aqueous suspension containing hydrogen type acidic cation exchange resin;

adsorbing metallic components of the sludge onto the resin; and recovering oxyacid components of the sludge from solution and the metallic components from the resin.

6. The method of claim 5 wherein the recovered oxyacid component is utilized as a phosphating agent.

7. The method of claim 1 or 5 wherein the sludge is filterable.

8. The method of claim 1 or 5 wherein the sludge is produced during coating of metal in a solution comprising zinc phosphate and phosphoric acid.

9. The method of claim 1 or 5 wherein the metal contains iron.

10. The method of claim 1 or 5 wherein the sludge is agitated with the exchange resin without the addition of a mineral acid.

* * * * *